United States Patent [19]

Muller et al.

[11] Patent Number: 5,660,609
[45] Date of Patent: Aug. 26, 1997

[54] METHOD AND DEVICE FOR THE BENDING OF GLASS SHEETS

[75] Inventors: Marco Muller; Karl-Josef Olfisch; Hans-Werner Kuster, all of Aachen, Germany; Claude Didelot, Thourotte, France

[73] Assignee: Saint-Gobain Vitrage, Courbevoie, France

[21] Appl. No.: 538,638

[22] Filed: Oct. 4, 1995

[30] Foreign Application Priority Data

Oct. 4, 1994 [FR] France .................. 94 11837

[51] Int. Cl.⁶ .................................. C03B 23/027
[52] U.S. Cl. .................. 65/107; 65/290; 65/291
[58] Field of Search .................. 65/107, 273, 287, 65/288, 289, 290, 291

[56] References Cited

U.S. PATENT DOCUMENTS

| | | | |
|---|---|---|---|
| 2,330,349 | 9/1943 | Galey | 65/291 |
| 2,857,713 | 10/1958 | Cleminson | 65/291 |
| 3,102,802 | 9/1963 | Carson et al. | 65/291 X |
| 3,235,350 | 2/1966 | Richardson | 65/291 X |
| 3,269,822 | 8/1966 | Carson et al. | 65/291 X |
| 3,281,231 | 10/1966 | McKelvey et al. | 65/289 X |
| 3,281,232 | 10/1966 | Wright | 65/289 X |
| 3,328,152 | 6/1967 | De Vore et al. | 65/291 X |
| 4,015,969 | 4/1977 | Brown et al. | 65/289 |
| 5,129,934 | 7/1992 | Koss | 65/107 |
| 5,167,689 | 12/1992 | Weber | 65/106 |

FOREIGN PATENT DOCUMENTS

| | | |
|---|---|---|
| 603958 | 11/1990 | Australia . |
| 1230952 | 9/1960 | France . |

*Primary Examiner*—Donald E. Czaja
*Assistant Examiner*—Sean Vincent
*Attorney, Agent, or Firm*—Oblon, Spivak, McClelland, Maier & Neustadt, P.C.

[57] ABSTRACT

A method and device for the bending, on a frame, at least one glass sheet by gravity includes two bending steps. The glass sheets are first supported at their periphery along a first peripheral line by a rough bending device during the first step and along a second peripheral line by a definitive bending device during the second step. Transfer of the glass sheets from the first peripheral line to the second peripheral line is performed by positively and continuously regulating a position of at least one of the rough and definitive bending devices in reaction to forces generated on the at least one of the rough and definitive bending devices by contact with the glass sheet.

16 Claims, 4 Drawing Sheets

FIG_1

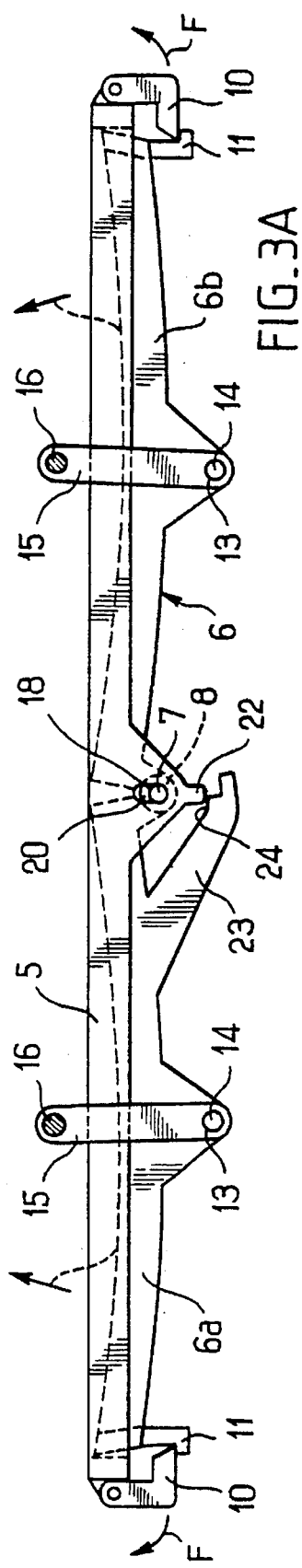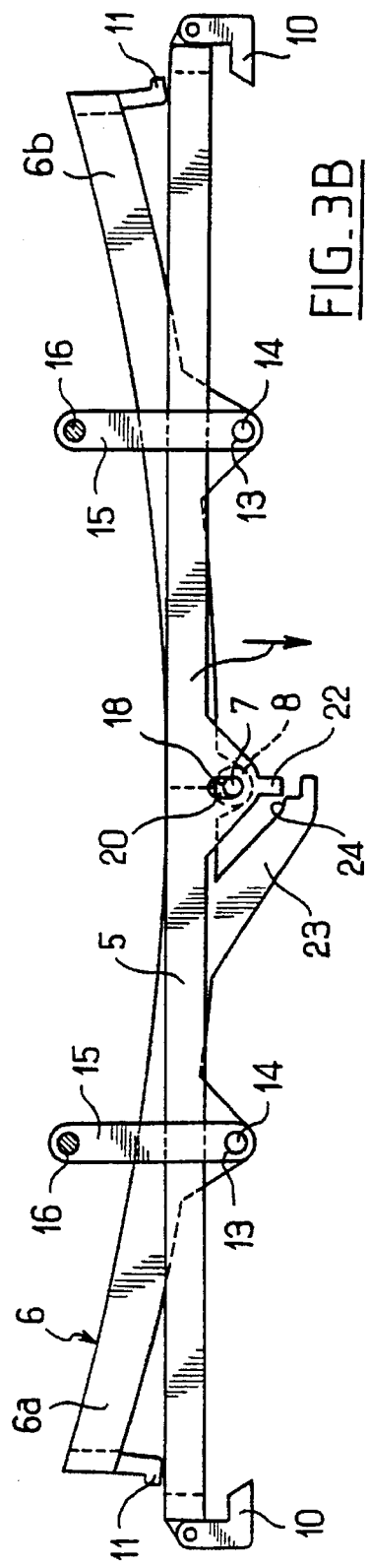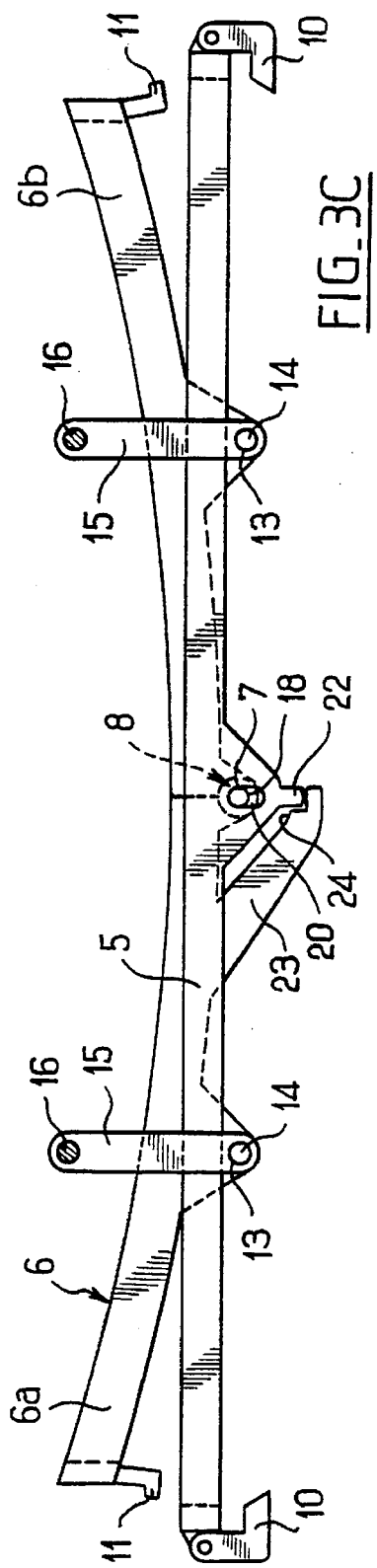

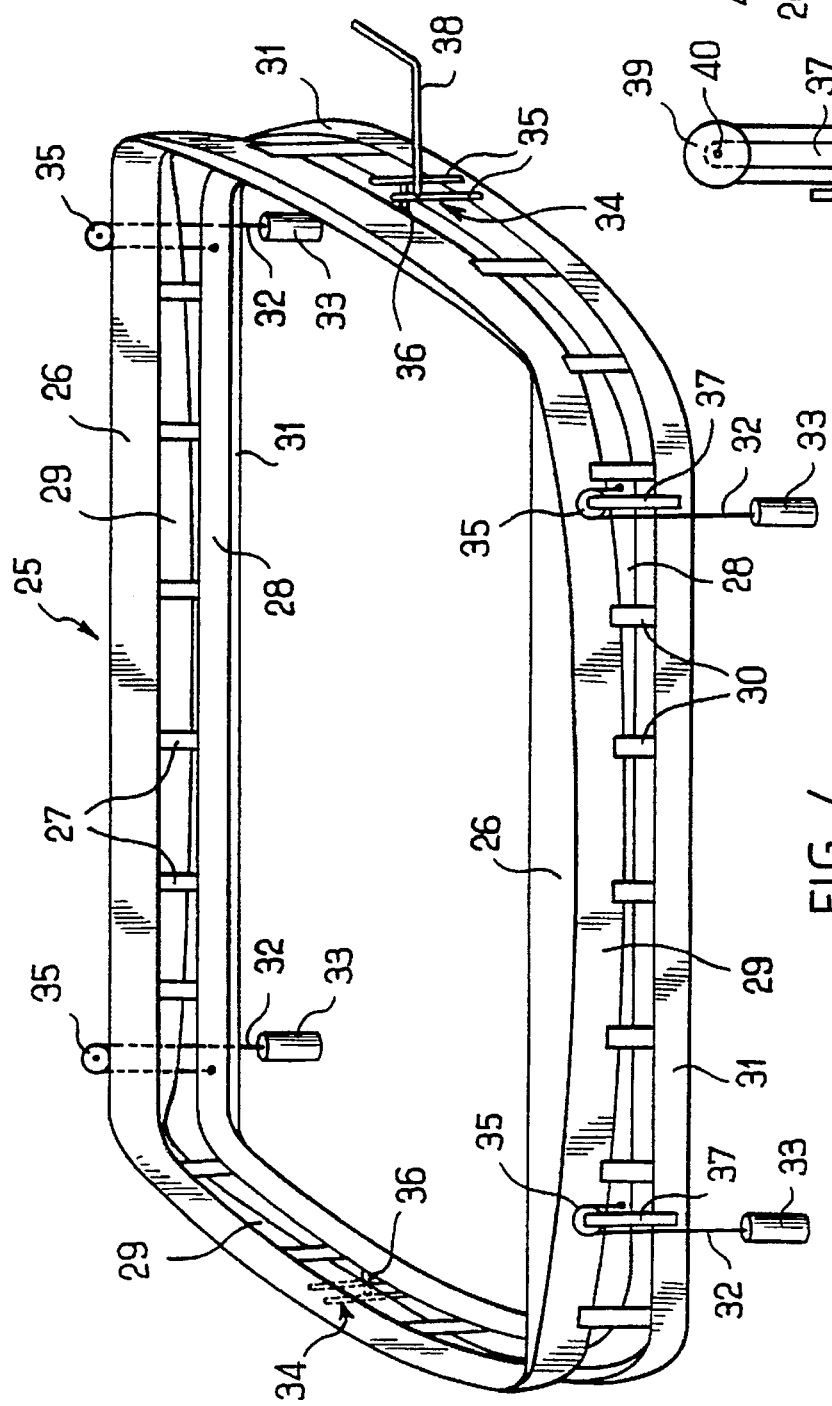
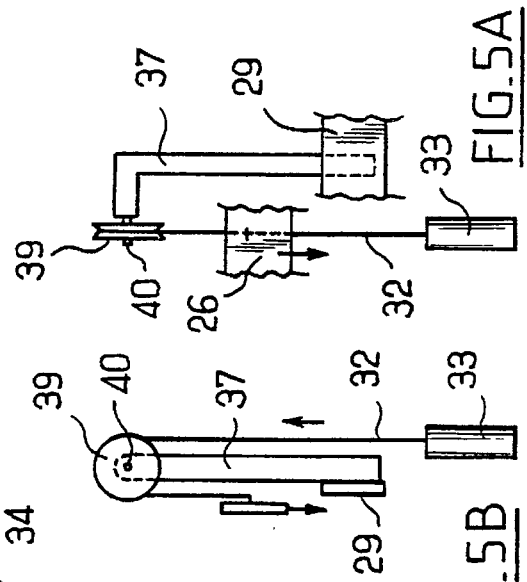
FIG. 4
FIG. 5A
FIG. 5B

METHOD AND DEVICE FOR THE BENDING OF GLASS SHEETS

BACKGROUND OF THE INVENTION

1. Field of the Invention

This invention concerns a method and a device for bending glass sheets by gravity on a bending frame or skeleton.

2. Discussion of the Background

From Publication EP-A-0 448 447 a method and a device are known for bending glass sheets by gravity in at least two successive steps. In a first step, the glass sheets are bent by gravity to a first shape roughly corresponding to the definitive shape, then in a second step the glass sheets are bent by gravity to the definitive shape.

For carrying out this method, a frame termed a rough frame is used for the first step and a frame termed a definitive frame is used for the second step. The definitive frame, by which the definitive bending is performed in the second bending step, may be an autonomous closed ring, which is disposed inside the rough frame or outside it, at a small distance from it. In a variant, the definitive bending frame may be formed of parts of the rough frame and of movable supplementary parts. In this way it is possible to associate with the rough frame symmetrical lateral parts which fold upwards for the operation of the definitive or final bend, thus forming a definitive frame at the most highly curved lateral parts, while the median part is common with the median part of the rough frame.

This known method is suitable, notably, for the bending of glass sheets of complex shape and/or glass sheets having a pronounced double curvature and/or for glass sheets that are subjected to a counter-bending in critical zones.

When, in such a method or device, the transfer of the bent glass sheet in the form of a blank onto the definitive frame does not take place in a uniform manner, that is symmetrically about the axis of symmetry in the case in which the bent glass sheets must have such a symmetry, defects of curvature can be produced relative to the desired curvatures, which can harm the optical quality of the glass sheets.

A non-uniform transfer between the frames can take place when the two extreme lateral parts of the glass sheet are not taken over at the same instant by the definitive frame. In this case the forces acting on the lateral parts of the softened glass sheet are not identical and simultaneous. This results in an undesirable asymmetrical bending of the glass sheet which can harm its optical property.

SUMMARY OF THE INVENTION

It is an object of the invention to provide a method and a device which alleviate the aforementioned disadvantages.

The method of bending, on a frame, of at least one glass sheet by gravity according to this invention, comprises first supporting the glass sheets at their periphery along a first peripheral line by a rough bending device and then along a second peripheral line by a definitive bending device. Transfer of the glass sheets from the first peripheral line to the second peripheral line is performed by positively and continuously regulating a position of at least one of the rough and definitive bending devices in reaction to forces generated on the at least one of the rough and definitive bending devices by contact with the glass sheet.

According to one of the aspects of the invention, the transfer between the two peripheral lines is performed by positively and continuously regulating a position of at least one of the rough and definitive bending devices in reaction to forces generated on the at least one of the rough and definitive bending devices by contact with symmetrical parts of the glass sheet.

The equilibrium of the action of the forces may be produced by a pivoting or tilting of one frame forming a peripheral line relative to the other, that is to say by the pivoting of the mean plane of one line relative to the mean plane of the other line.

When the bent glass sheet or sheets must have a symmetry, the equilibrium of the action of the forces according to this invention may be achieved by a mounting of at least one of the frames forming the two peripheral lines pivotally about a horizontal axis. As described in the already mentioned EP-A-0 448 447, from which the person skilled in the art can obtain the necessary theory, the two peripheral lines may be entirely distinct from each other, the one being disposed inside the other, the replacement of one line by the other taking place, for example, either by a raising of the level of the second frame relative to the level of the first, or by a lowering of the level of this first line, or again by a combination of these two movements.

In a variant, the frame forming the second peripheral line may be distinct in parts only from the frame forming the first peripheral line. The distinction or difference may apply to the lateral parts of the two lines.

In this case, the difference generally consists in that the lateral parts of the second line have more accentuated curvatures than, and are situated in a working position at a higher level than, the lateral parts of the first line.

The peripheral lines are generally continuous lines, in particular for the line defining the definitive bent shape of the glass sheet or sheets, although a line formed of several points or segments disposed at appropriate positions may also be suitable.

The peripheral line corresponding to the first bending step may be inside or outside the peripheral line corresponding to the other bending step.

Each of the two peripheral lines may also have a shape that varies during the course of one bending step.

According to one of the aspects of the invention, the equilibrium of the action of the forces that act upon the desired parts of the glass sheet is established by reaction movement of one or both frames under the action of contact of the glass sheet with these frames.

The invention relates also to a device, or double bending frame, comprising two frames: a first frame or rough frame intended for supporting the periphery of the glass sheet or sheets to be bent during a first bending step, a second frame or definitive frame, replacing the first for supporting the periphery of the glass sheet or sheets during the second bending step, and means for transferring support of the glass sheet from the first frame to the second frame by positively and continuously regulating a position of at least one of said rough and definitive bending devices in reaction to forces generated on said at least one of said rough and definitive bending devices by contact with the glass sheet.

The term rough frame is to be understood, according to this invention, as meaning the frame on which a first bending operation of the glass sheet or sheets by gravity takes place. The term definitive bending frame or definitive frame is to be understood according to this invention as meaning the frame on which the next bending step by gravity, which corresponds mainly to the definitive bending step and which produces the final desired bending, takes place. More generally, the rough frame is the frame on which an operation or step of bending by gravity is carried out and the definitive frame is the frame on which the next operation or step of bending by gravity is carried out, it being understood that possibly other bending steps may precede and/or follow the two steps referred to.

In the remainder of this description, the expression "a glass sheet" or "the glass sheet" will be used equally for a single glass sheet or for two stacked glass sheets and, possibly, more than two stacked glass sheets.

The means for positively regulating the position of at least one of said rough and definitive bending devices may be a pivoting and balanced mounting of one frame with respect to the other or, more generally, a mounting permitting the tilting of the mean plane of one frame with respect to the mean plane of the other frame.

Thus, according to one embodiment of the device according to this invention, at least one of the two bending frames has the form of a rigid ring mounted pivotally and in a balanced manner on an axis situated in the plane of symmetry of the device.

The pivotal mounting in the manner of a Roman balance (or steelyard) having equal arms causes a tilting of the frame when the forces applied onto the glass sheet on either side of the axis of symmetry are not equivalent. In contrast, when the forces applied are equivalent, the frame is in equilibrium.

The pivot axis may be situated either above or below, or in the axis of, the glass sheet.

When the rough frame is pivotally mounted according to one embodiment in conformity with this invention, the device functions in the following manner: during the transfer of the present glass sheet from the rough frame to the definitive frame, the first contact of the glass sheet with the definitive frame takes place in the highest, extreme lateral parts of this definitive frame. If, for any reason, the glass sheet does not simultaneously come into contact with the highest end parts on both sides, but is first in contact with one side, then the rough frame, unloaded on this side of the weight of the glass sheet, tilts on the other side until the glass sheet comes into contact with the definitive frame, which relieves the rough frame of load on this side. A balance takes place in a continuous and rapid manner due to the lateral forces exerted on the glass sheet until it is entirely transferred onto the definitive frame. Finally, a quite symmetrical bending in achieved when such a symmetry is desired and one that is as uniform as desired for the glass sheet.

In one variant of the device according to this invention, it may be the definitive frame that is pivotally mounted and in equilibrium about an axis.

In another variant of the device, both frames are pivotally mounted and in equilibrium.

In one form of embodiment of the invention, a frame is formed of several parts articulated to one another.

The rough frame may have various shapes. In its simplest form of construction it is composed of a plane frame, on the periphery of which the glass sheet rests from the commencement of bending.

The shape of the rough frame also enables the definitive shape of the glass sheet to be influenced.

Other means enabling mastery or control of the forces applied on the glass sheet during its passage from one frame to the other may be provided. These means may be a mounting of at least one of the two frames on an elastic system, such as springs, an air cushion, or systems using counterweights, for example, the objective being to balance the forces applied on the glass sheet about its axis of symmetry when it has such an axis of symmetry, or about other axes or datums when the bent glass sheet does not have such symmetry.

BRIEF DESCRIPTION OF THE DRAWINGS

Such forms of mounting and characteristics of the invention will be apparent from the following description of examples of embodiment of the device, prepared in relation to the figures.

FIGS. 3A, 3B, 3C show a constructional detail of the articulation or hinge concerning the pivoting of the rough frame;

FIG. 4 shows a variant of the device according to this invention; and

FIGS. 5A and 5B show a detail of the variant according to FIG. 4.

DESCRIPTION OF THE PREFERRED EMBODIMENTS

Figure 1:
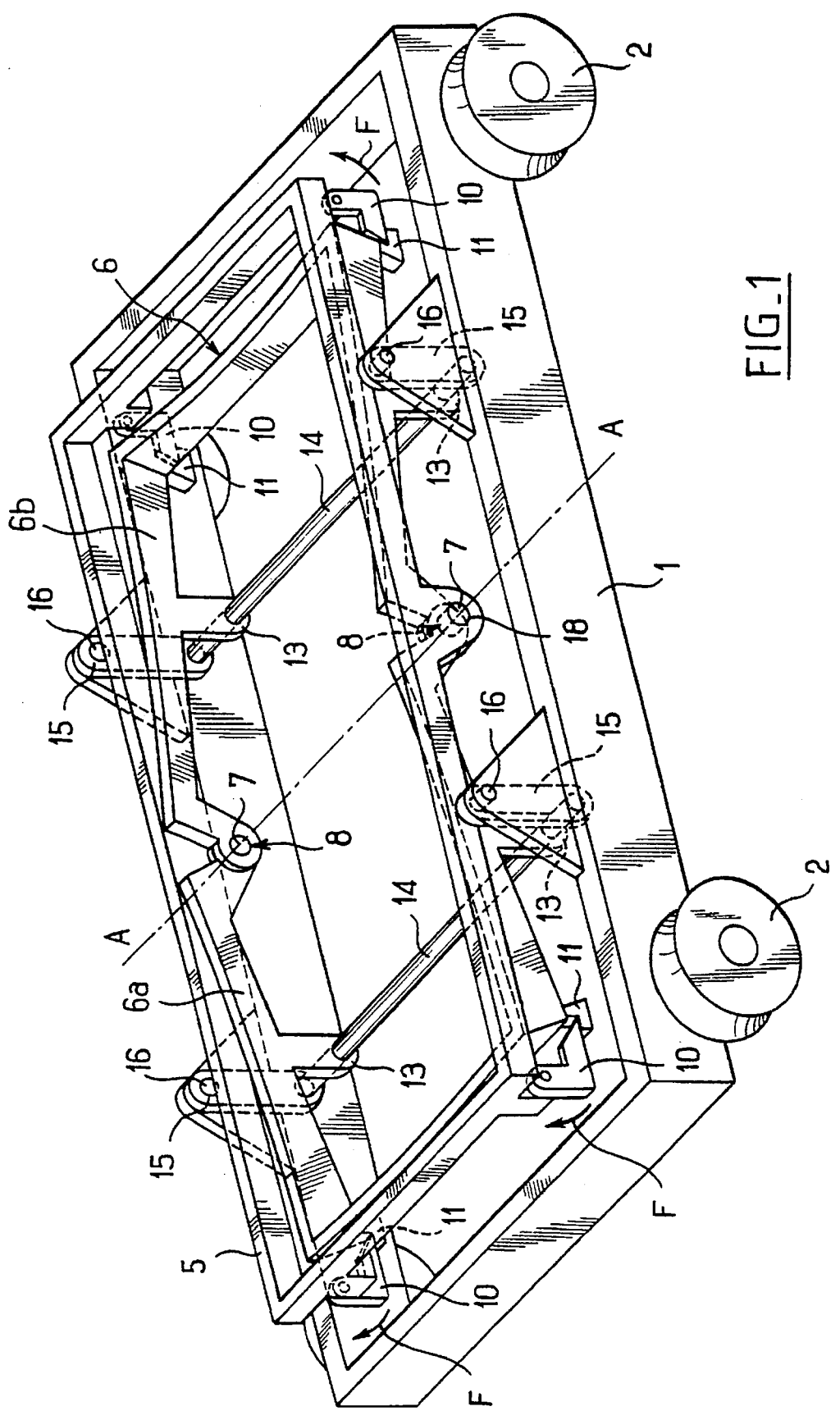
FIG. 1 shows a bending device mounted on a movable carriage, the rough frame being in the working position.
Figure 2:
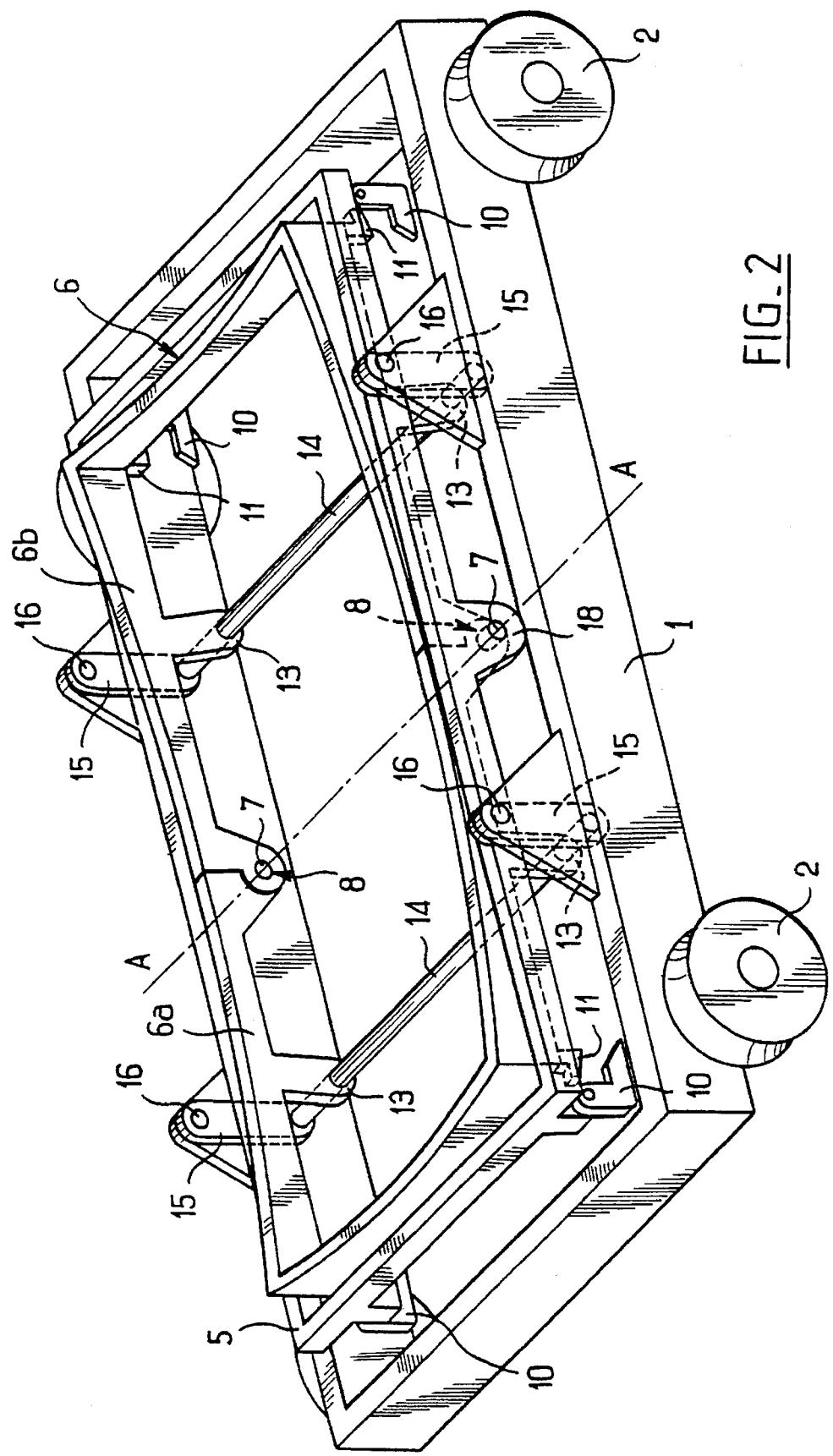
FIG. 2 shows the device of FIG. 1, with the definitive frame in the working position.

The bending device shown in FIGS. 1 to 3 is mounted on a movable carriage 1. The carriage 1, provided with wheels 2, can travel on rails through a gravity-bending furnace (not shown). In a furnace for bending by gravity, as soon as the glass sheet deposited on the bending device reaches its deformation temperature, the sheet bends under gravity and comes into bearing at its peripheral part on a bending frame. This technique of bending on a frame by gravity is used and well known, notably for the bending of pairs of glass sheets which are later assembled together to form a laminated pane.

The device according to the invention described here comprises two bending frames: a rough frame 5 and a definitive frame 6 producing the definitive bent shape. This definitive frame is, in the present case, composed of two half-frames 6a and 6b, the two symmetrical parts 6a and 6b being connected together by the articulations 8 disposed about the axles 7 situated on the axis A—A and mounted on pivot bearings 18 of the rough frame 5.

The rough frame 5 and the two half-frames 6A and 6b forming the definitive frame are so disposed that the rough frame 5 is situated at a higher level during the first bending step. Thus, in this position, a glass sheet resting on the rough frame 5 does not come into contact with the half-frames 6a and 6b. In this position, the rough frame bears, through the intermediary of four hinged bolts 10 disposed at the four corners of the rough frame, on bearing elements 11 fixed to the four corners of the half-frames 6a and 6b. The weight of the rough frame 5 thus holds the two half-frames 6a and 6b in the lowered (or open) position.

The rough frame 5 is, in addition, provided in its plane of symmetry passing through the axis A—A, with the two pivot bearings 18, disposed about the same pivot axis A—A as the two articulations 8 of the half-frames 6A and 6b. As a result of this method of connecting the rough frame 5 to the two half-frames 6a and 6b, the latter are automatically brought into the at-rest position shown in FIG. 1 when the rough frame 5 is raised and fixed in position by the bolts 10.

The half-frames 6a and 6b are articulated about shafts 14 by means of the bearings 13. The shafts 14 are mounted oscillating by means of levers 15 articulated on axes 16 carried by bearing blocks 17, themselves mounted on the carriage 1.

In the bending furnace (not shown) there is provided a transfer station for the present glass sheet in the form of a rough, for transferring it from the rough frame 5 to the definitive frame 6. For this purpose, the bolts 10 are retracted from the support elements 11 by a pivoting movement in the direction of arrow F operated by means of a suitable device, not shown. The weight of the rough frame, plus that of the glass sheet, is thus transferred to the articulation 8, which causes the half-frames 6a and 6b to pivot upwards and at the same time lowers the rough frame 5. Since this rough frame 5 rests solely on two pivot bearings while it is lowered from its upper working position to its lower at-rest position, it can pivot about the axis A—A during the transfer, which makes possible, according to this invention, the balance of the forces on the glass sheets.

In the working position of the definitive frame 6, as shown in FIG. 2, the rough frame 5 has descended until the glass sheet is resting on the definitive frame 6.

If it is desired to lower the rough frame 5 clearly below the definitive frame 6, it is possible to give the hole in pivot bearings 18 the form of an oblong hole 20 with its long axis vertical, as shown in FIG. 3.

In FIG. 3A, when the rough frame 5 is situated in its working position, the lower part of the oblong hole 20 bears against the underside of the pin 7 of the articulation 8, which opens the two half-frames 6a and 6b and which engages the bolts 10, which thus lock this position.

To bring the definitive frame into its working position, the bolts 10 are disengaged. As a result of a suitable distribution of the weight of the parts of the half-frames 6a and 6b on both sides of the pivot bearings 13, the two half-frames 6a and 6b close around the articulation 8, the parts adjacent to this axis descending at the same time as the end parts rise, to pick up the glass sheet from the rough frame 5.

The final working position of the definitive frame is shown in FIG. 3B. During the tilting movement, the rough frame bears, through the intermediary of a projection 22 disposed beneath the oblong hole 20, on the curved surface 24 of an arm 23 integral with the half-frame 6a. A suitable construction of the sliding surface is provided so as not to interfere with the pivoting of the rough frame about the articulation 8.

When the half-frames 6a and 6b have reached their extreme position and the transfer of the glass sheet from the rough frame to the two half-frames forming the definitive frame is completed, the projection 22 has reached the end of the curved surface 24 of the arm 23. At this instant the rough frame is no longer supported by the curved surface 24 and it descends by the height of the oblong hole 20. The position reached is now shown in FIG. 3C. In this way it is ensured that the glass sheet is no longer at all in contact with the rough frame.

The device 25 shown in FIG. 4 and partially in greater detail in FIGS. 5A and 5B (seen from the side and front), comprises a rough frame 26 mounted by means of feet 27 on a support 28, also frame-shaped, and a definitive frame 29, itself also mounted by means of feet 30 on a frame-shaped support 31.

The rough frame 26 and its support 28 are disposed inside the peripheries of the definitive frame 29 and its support 31, respectively. The two supports 28 and 31 can be disposed on a carriage, not shown, enabling the device to be transported through the bending furnace. The rough frame 26 and its support 28 are mounted in equilibrium on the definitive frame 29 and its support 31 by means of four cables 32 carrying counterweights 33 as described in more detail below, notably in relation to FIGS. 5A and 5B.

Two slides, each formed of two vertical rods 35 mounted on the support for the definitive frame, at two mutually opposite positions, serve as guides for two fingers 36, mounted integrally on the support for the rough frame during the vertical movement of one frame relative to the other.

As shown in greater detail and partly in FIGS. 5A and 5B (in front and profile view), the mounting of the rough frame 26 and its support 28 on the definitive frame 29 and its support 31 is provided by four cables 32, of which one end 34 of each is fixed to the support 28 for this rough frame 26, substantially at the four corners of this support 28, the four cables 32 passing around sheaves 39, the axes 40 of which are carried by posts 37 fixed to the support 31 for the definitive frame and terminating at counterweights 33. The total weight of the four counterweights 33 corresponds substantially to the weight of the rough frame 26 and its support 28. A linkage 38 enables the rough frame to be blocked in its raised position which corresponds to its working position, by bearing, for example, beneath the fingers 36 in the slides 34.

The device operates in the following manner:

The glass sheet or sheets having been placed on the rough frame 26, disposed and blocked by the linkage 38 in its upper working position, as shown in FIG. 4, the whole of the device travels into the bending furnace.

During the first bending operation, the glass sheet is resting on the periphery of the rough frame. When the glass sheet has achieved its desired rough bent shape, the rough frame 26 is released by action on the linkage 38 from its raised position. Under the effect of the weight of the glass sheet, the rough frame descends in the direction of the arrows shown in FIGS. 5A and 5B, in a balanced manner while supported by the four cables 32 and the counterweights 33 which are ascending, and guided by the fingers 36 in the slides 35 to bring the glass sheet into contact with the definitive frame. The contact takes place in a controlled and balanced manner. The rough frame can, if necessary, pivot partly during this contact about the axis formed by the two fingers 36. The descending movement of the frame takes place under the influence substantially of the weight alone of the glass sheet or sheets. It is also possible to modify the weight of the counterweights in order to modify the contact forces between the glass sheet and the definitive frame. The bending operation continues with the glass sheet being supported by the definitive frame.

It is also possible to amount the two frames in the opposite way to that previously described; that is, to mount the definitive frame in equilibrium on the rough frame and thus to obtain an ascending movement of the definitive frame with respect to the rough frame for the transference of the glass sheet.

The device according to this invention envisages, in fact, all the means for mounting in equilibrium of one frame on another permitting a relative ascending-descending motion of one frame with respect to the other.

The periphery of the rough from can equally well pass through the inside of the periphery of the definitive frame as the other way round.

The method and the device according to the invention, making possible the adjustment and control of the forces acting on the glass sheet, are applicable to any bending method requiring the transfer of one or more sheets of glass from one frame to another in order to pass from one bending step to a succeeding bending step.

The bent glass produced by the use of the method and the device according to this invention has a high uniformity of the desired curvatures.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method of gravity bending at least one glass sheet, heated to the deformation temperature thereof, comprising the steps of:

a first gravity bending step of causing the glass sheet to bend to to a rough form while supporting the sheet by a rough bending device acting on the sheet along a first peripheral line;

a second gravity bending step of causing the glass sheet to bend to to a definitive form while supporting the sheet by a definitive bending device acting on the sheet along a second peripheral line; and between said first and second gravity bending steps, transferring support of the glass sheet from the first peripheral line to the second peripheral line by positively and continuously regulating a position of at least one of said rough and definitive bending devices in reaction to forces generated on said at least one of said rough and definitive bending devices by contact with the glass sheet.

2. The method according to claim 1, wherein said transferring step comprises transferring support of the glass sheet from the first periheral line to the second peripheral line by positively and continuously regulating a position of at least one of said rough and definitive bending devices in reaction to forces generated on said at least one of said rough and definitive bending devices by contact with symmetrical parts of the glass sheet.

3. The method according to claim 1 wherein said step of positively and continuously regulating a position of at least one of said rough and definitive bending devices comprises pivoting one of said rough and definitive bending devices relative to the other.

4. A device for gravity bending at least one glass sheet, heated to the deformation temperature thereof, comprising:

a rough bending frame for supporting the sheet along a first peripheral line;

a definitive bending frame for supporting the sheet along a second peripheral line; and means for transferring support of the glass sheet from the first periheral line to the second peripheral line by positively and continuously regulating a position of at least one of said rough and definitive bending frames in reaction to forces generated on said at least one of said rough and definitive bending frames by contact with the glass sheet.

5. The device according to claim 4, wherein at least one of said frames is pivotally mounted in a balanced manner on an axis situated in the plane of symmetry of the device.

6. The device according to claim 4 wherein said frames comprise rigid continuous rings and said means for transferring support of the glass sheet from the first periheral line to the second peripheral line by positively and continuously regulating a position of at least one of said rough and definitive bending devices comprises means for verically linearly moving at least one of said rings.

7. The device according to claim 4, wherein one of said frames comprises a rigid ring and the other of said frames comprises pivoting parts, and wherein said means for transferring support of the glass sheet from the first periheral line to the second peripheral line by positively and continuously regulating a position of at least one of said rough and definitive bending devices comprises means for pivoting said pivoting parts.

8. The device according to claim 7, wherein the other of said frames is formed of two symmetrical half-frames connected by an articulation disposed in the plane of symmetry of the device.

9. The device according to claim 8, wherein said means for pivoting said pivoting parts comprise:

pivoting levers; and bearings mounting one of said half-frames to an end of each of said levers.

10. The device according to claim 9 wherein said means for pivoting said pivoting parts further comprise said one of said frames being pivotally mounted to said half-frames at a pivot axis coinciding with said articulation of said half-frames.

11. The device according to claim 10, including hinged elements locking said one frame in a fixed position relative to said half-frames.

12. The device according to claim 10, wherein said pivot axis of said one of said frames is vertically movable relative to said half frames.

13. The device according to claim 9, including a movable carriage to which said levers are pivotally mounted.

14. A device for gravity bending at least one glass sheet, heated to the deformation temperature thereof, comprising:

a rough bending frame for supporting the sheet along a first peripheral line;

a definitive bending frame for supporting the sheet along a second peripheral line; and means for transferring support of the glass sheet from the first peripheral line to the second peripheral line by positively and continuously regulating a position of at least one of said rough and definitive bending frames in reaction to forces generated on said at least one of said rough and definitive bending frames by contact with the glass sheet, wherein said means for transferring comprises a pivoting and balanced mounting of one of said rough and definitive bending frames with respect to the other of said rough and definitive bending frames.

15. A device for gravity bending at least one glass sheet, heated to the deformation temperature thereof, comprising:

a rough bending frame for supporting the sheet along a first peripheral line;

a definitive bending frame for supporting the sheet along a second peripheral line; and means for transferring support of the glass sheet from the first peripheral line to the second peripheral line by positively and continuously regulating a position of at least one of said rough and definitive bending frames in reaction to forces generated on said at least one of said rough and definitive bending frames by contact with the glass sheet, wherein said means for transferring comprises means for mounting said rough and definitive bending frames to permit tilting of the mean plane of one of said rough and definitive bending frames with respect to the mean plane of the other of said rough and definitive bending frames in reaction to forces generated on said at least one of said rough and definitive bending frames by contact with the glass sheet.

16. A method of gravity bending at least one glass sheet, heated to the deformation temperature thereof, comprising the steps of:

- a first gravity bending step of causing the glass sheet to bend to a rough form while supporting the sheet by a rough bending device acting on the sheet along a first peripheral line;
- a second gravity bending step of causing the glass sheet to bend to a definitive form while supporting the sheet by a definitive bending device acting on the sheet along a second peripheral line; and
- between said first and second gravity bending steps, transferring support of the glass sheet from the first peripheral line to the second peripheral line by positively and continuously regulating a position of at least one of said rough and definitive bending devices in reaction to forces generated on said at least one of said rough and definitive bending devices by contact with the glass sheet by permitting tilting of the mean plane of one of said rough and definitive bending frames with respect to the mean plane of the other of said rough and definitive bending frames in reaction to forces generated on said at least one of said rough and definitive bending frames by contact with the glass sheet.

* * * * *